INVENTORS
FRANK STUART HARWOOD
CARL T. PRUCHA
HEINZ DORST

BY~ Maybee & Legris
ATTORNEYS

July 4, 1967  F. S. HARWOOD ET AL  3,329,240
ELEVATOR ROLLER GUIDE ASSEMBLY
Filed Jan. 7, 1966  2 Sheets-Sheet 2

*INVENTORS*
FRANK STUART HARWOOD
CARL T. PRUCHA
HEINZ DORST
BY~ *Maybee & Legris*
ATTORNEYS

United States Patent Office 3,329,240
Patented July 4, 1967

3,329,240
ELEVATOR ROLLER GUIDE ASSEMBLY
Frank Stuart Harwood, Richmond Hills, Ontario, Carl T. Prucha, Toronto, Ontario, and Heinz Dorst, Milton, Ontario, Canada, assignors to Turnbull Elevator Limited, Toronto, Ontario, Canada, a company
Filed Jan. 7, 1966, Ser. No. 519,327
8 Claims. (Cl. 187—95)

The present invention relates in general to guides for movable bodies and more particularly to roller guides for vertically moving conveying devices such as elevators.

The customary procedure now adopted for guiding vertically moving conveying means, such as elevators, is to utilize T-shaped rails fixed in the hoistway with guide devices mounted on the conveying mechanism which engage and ride on the T-shaped rails. The guide devices have been adapted to contact each of three flat surfaces on each rail and originally this contact was made by way of solid shoe-type devices. With increased elevator speeds procedures were changed to utilize rollers to engage and run on the three flat surfaces of each guide rail. These rollers were made in sets of three with one roller running on each flat surface of a rail.

Since it is exceedingly difficult to mount and maintain guide rails in perfect alignment and the conveying device in perfect balance it became increasingly evident that improvements had to be made in the guide rail and roller arrangement to reduce noise level in and swaying of the conveying device. One improvement developed was the provision of a flexible mounting for each set of three roller guide assemblies. Another improvement was to provide a mounting for each roller allowing independent movement therein and using a spring of elastomeric or metallic material to provide an opposing resilient force against variable rail pressure. Another new design provided separate double roller assemblies for each rail surface mounted in whipple tree configuration, with six rollers used for each roller guide assembly.

All of these variations in roller guide assemblies have a serious basic deficiency. Thus, with even the most careful alignment of roller guides with guide rails, any unbalance causing deflection of the face rollers results in misalignment of the side rollers and, conversely, any unbalance resulting in deflection of the side rollers causes misalignment of the face rollers. A rotating misaligned roller tends to rotate and move in the direction it is facing and not parallel to the long axis of the guide rail. Eventually, of course, a stop on the conveying device or pressure from other rollers forces the misaligned roller to move sideways on the rail and then resume its inclined path again if misaligning forces remain the same. This repeated pattern resulting in skidding and shifting of rollers is one of the most serious causes of vibration, swaying and noise in operation of a conveying device, such as an elevator car, guided on rails.

It has now been discovered that a roller guide assembly can be provided for conveying devices which substantially avoids misalignment of face and side rollers in relation to the guide rail despite unbalance in or uneven movement of the conveying device and despite misalignment and deflection of the guide rails.

It is an object of the present invention to provide a roller guide assembly for conveying devices which substantially insures that all side rollers and all face rollers maintain alignment with the guide rail on which they are running.

It is a further object of the present invention to provide a novel roller guide design for vertically moving conveying devices, such as elevators, which permits adjustable preloading of rollers against the guide rail to substantially eliminate loss of contact between any roller and the rail.

Other objects and advantages of the invention will become apparent from the following description taken in conjunction with the accompanying drawing in which.

Generally speaking, the present invention relates to a roller guide assembly for a conveying device which is guided by and rides on a guide rail having two opposing side roller running portions and a face roller running portion. The assembly comprises a substantially rigid roller mounting cage member having a face roller receiving portion and a side roller mounting portion. Six rollers are rotatably mounted on the cage member with each being mounted in fixed position with respect to the cage member and with respect to each other. The six rollers are arranged in two spaced apart sets of three rollers. Each set comprises two opposing side rollers rotatably mounted on the side roller mounting portion of the cage member and adapted to run on the opposing side roller running portions of the guide rail and a face roller rotatably mounted in the face roller receiving portion of the cage member and adapted to run on the face roller running portion of the guide rail. The assembly includes mounting means for the cage member with the cage member being pivotally mounted on said mounting means, the pivotal mounting being located between the two sets of rollers. The cage member has flexible loading means associated therewith which is adapted to flexibly preload the face rollers against the face roller running portion of the guide rail.

Figure 1:
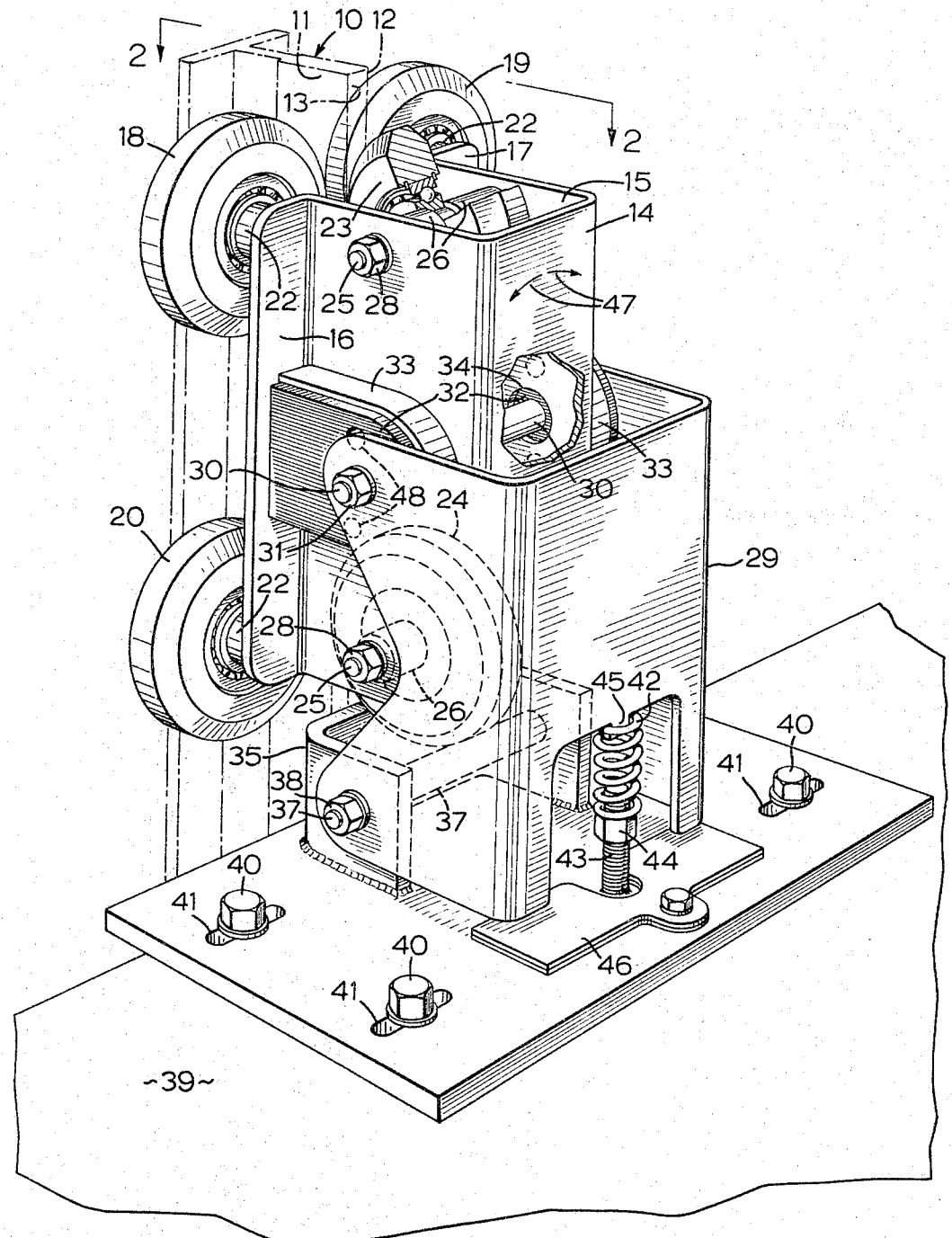
FIG. 1 is a perspective view from above and to one side of a roller guide assembly arrangement embodying the present invention with portions of the assembly shown cut away.

Referring now to the drawings, FIG. 1 shows a perspective view of the complete roller guide assembly, with portions broken away. The roller assembly is adapted to be guided by and move on a guide rail 10 (shown in broken line in FIG. 1) which has two opposing side roller running portions 11, 12 and a face roller running portion 13. The rollers for the assembly are all mounted on a first, inner cage member 14 of generally U-shaped cross section which has a face roller receiving portion 15 and side roller mounting portions 16, 17 at the open side of the U section. In FIG. 1 the mounting portions 16, 17 are shown as running along the length of the cage member 14, although separate side roller mounting portions may be used, if desired, for each of the guide rollers mounted thereon, or the cage may have a single solid side roller mounting portion thereon with face rollers projecting through slots therein. A first upper pair of opposing side rollers 18, 19 are integrally mounted on the mounting portions 16, 17 at the top thereof and a second, lower pair of opposing side rollers 20, 21 (roller 21 being hidden and not being shown) are integrally mounted at the bottom of the mounting portions 16, 17. Each of the side rollers 18, 19, 20, 21 is mounted to freely rotate on an axle member 22 attached to the mounting portions 16, 17 and the side rollers are mounted in such a manner as to be adapted to run on the opposing side roller running portions 11, 12 of the guide rail 10.

Figure 2:
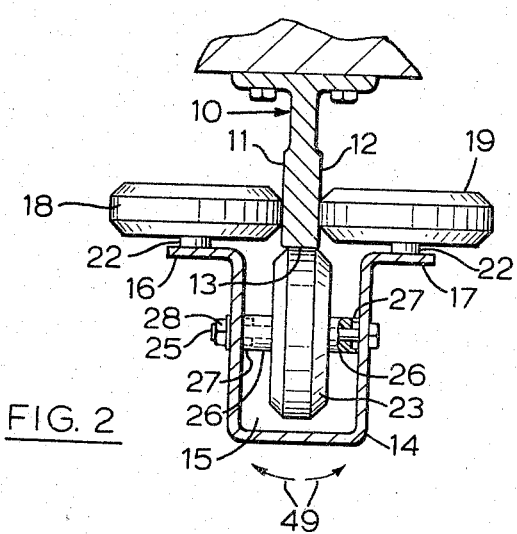
FIG. 2 is a plan view of a portion of the assembly arrangement along line 2—2 of FIG. 1 showing the relation of a set of rollers to the guide rail.

The roller receiving portion 15 of the first cage member 14 contains two face rollers, i.e., an upper roller 23 and a lower roller 24 (shown mostly hidden in FIG. 1). The face rollers 23, 24 are mounted on adjustable bolts 25 to freely rotate thereon and are mounted in the same grouping, respectively, as the upper apir of the side rollers 18, 19 and the lower pair of the side rollers 20, 21. The six rollers are thus arranged in two spaced apart sets of three rollers in each set. The face rollers 23, 24 are mounted in the roller receiving portion 15 of the cage member 14 in such a manner as to be adapted to run on the front roller running portion 13 of the guide rail 10. The bolts 25 on which the rollers 23, 24 are mounted are preloaded by way of spacing collars or sleeve members 26 made of resilient material, such as tough, flexible plastic. The mounting arrangement of the face rollers 23, 24 is best illustrated in FIG. 2 which is a plan view along line 2—2 of FIG. 1 and shows the arrangement of a set of three guide rollers on the cage member 14 and set to operate on the guide rail 10 with a portion of one of the collars 26 shown cut away. The collars 26 surround the bolts 25, as shown in FIG. 2, and have annular projecting portions 27 thereon which bear against the inner surface of the cage member 14 and allow easy lengthwise compression of the collars. Before the guide roller assembly is mounted on the rail 10 the bolts 25 are tightened by means of nuts 28 to just provide a tight fit for the rollers 23, 24 in the cage member 14. At the same time, in preloading the bolts 25 enough space is left between the side roller 18 and the side roller 19 and between the side roller 20 and the side roller 21 to allow these rollers to be readily placed over the rail 10. The nuts 28 are then further tightened on the bolts 25 to compress and shorten the resilient collars 26 and draw the separated mounting faces 16, 17 and the opposing side rollers 18, 19 and 20, 21 closer together and thereby load each side roller against the rail 10.

The first cage member 14 is received by and pivotally supported in a second cage member 29, which also has a generally U-shaped cross section, by way of a first supporting pin 30 on which the cage member 14 pivots and which runs through the first cage member 14 and through the sides of the second cage member 29. The pin 30 runs through the cage member 29 at the open side and top thereof with the pin being fastened in place by means of a nut 31. The pin 30 is mounted in bushings 32 of tough, resilient material, such as elastomeric rubber or resilient plastic. The bushings 32 are mounted and retained in frame members 33 outside the inner, first cage member 14 and integral therewith and the pin 30 runs through oversize holes 34 in the cage member 14 (one hole only being seen in FIG. 1 through the cut-away portion in the cage member 14). The holes 34 are substantially larger in diameter than the pin 30 so that direct contact between the cage member 14 and the pin 30 is avoided, the bushings 32 being interposed between the pin and the cage member. At the same time, adequate support is provided for the cage member 14 by the bushings 32 of strong and durable elastomeric material.

The second cage member 29 is in turn pivotally supported by supporting portion 35 of assembly mounting member 36. Attachment of the cage member 29 is made by means of a second supporting pin 37 on which the cage member 29 pivots and which runs through the supporting portion 35 and through the second cage member 29 at the bottom and open side thereof, with nut 38 making the connection fast. The supporting portion 35 is an integral part of the assembly mounting member 36 and it may be two separate projecting portions or a U-shaped portion, as shown, for extra strength or it may be rectangular in shape, if desired, for even greater strength. The assembly mounting member is attached to the conveying device being guided, e.g. to the frame 39 of an elevator car, such as by nuts and bolts 40, with slotted holes 41 in the mounting member 36 allowing horizontal positioning of the whole roller guide asembly on the guide rail 10. The mounting member 36 may have a notch in the front portion thereof which embraces but does not normally contact the front portion of the rail 10. This provides a safety feature for emergency guidance of the conveying device in the event that the roller guide assembly breaks off.

In the embodiment shown in FIG. 1 the cage member 29 is resiliently supported at the closed side thereof on a compressed helical spring 42 seated on a bearing member 43 which is integrally attached to the assembly mounting member 36. The spring loaded bearing member 43 is advantageously a threaded pin with a nut 44 adjustably located thereon on which the compressed spring 42 is seated. Projecting portion 45 on the cage member 29 is seated within the spring 42. It can be seen that by adjusting the nut 44 upwardly the upper end of the cage member 29 can be tilted toward the rail 10. Shims 46 on the mounting member 36 and located under the edge of the cage member 29 provide a means for limiting the backward pivotal travel or tilt of the cage member 29 away from the rail 10. The cage member 29 is seen to be flexibly loaded toward the guide rail 10 with the cage member 14 in turn being flexibly loaded in a like manner so that the face rollers 23, 24 are preloaded against the face roller running portion 13 of the guide rail 10 and are brought into pressing engagement therewith. Other spring arrangements or hydraulic cylinder arrangements, well known to the art, can be utilized to provide a flexible loading means for the cage member 29.

Figure 3:
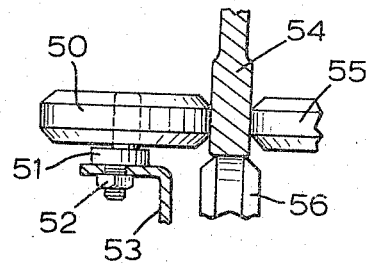
FIG. 3 is a plan view of a different arrangement of side guide roller bolted to the cage member supporting the rollers.

Although the side rollers are shown in FIG. 1 and FIG. 2 as being loaded against the guide rail by way of preloaded bolts 25, other means for bringing the side rollers into pressure contact with the guide rail may be utilized. Thus, for example, side rollers may be bolted to the supporting cage member by way of eccentric bolts which can be turned, after a roller guide assembly has been placed around a rail, to bring the side rollers into engagement with the rail. Referring to FIG. 3, a side roller 50 is seen mounted on an eccentric bolt or axle member 51 which is connected by way of a nut 52 to a cage member 53 (only a portion of which is shown) on which rollers of a roller guide assembly are mounted. The bolt 51 is seen to be turned so as to bring the side roller 50 into pressing engagement with a guide rail 54 (shown in cut-away section). Broken-away portions of an opposing side roller 55 and a face roller 56 are also shown in FIG. 3.

Describing the operation of the roller guide assembly, the assembly is mounted on the conveying device and on the guide rail 10, as shown in FIGS. 1 and 2. An elevator car has four of these assemblies mounted thereon at the top and bottom of opposite sides of the car and the car rides on two guide rails with top and bottom roller guide assemblies running on each guide rail. The preloaded bolts 25 are tightened by way of nuts 28, as aforedescribed, to bring each side roller to bear against the side roller running portions of the guide rail. At the same time; the nut 44 on the bearing member 43 is adjusted to tilt the cage member 29 and with it the cage member 14 towards the guide rail 10 so that the two face guide rollers are loaded by the spring 42 against the front roller running portion 13 of the guide rail. The shims 46 are placed in position to prevent excessive backward pivotal motion in the roller guide assembly.

It can be seen that when the aforedescribed roller guide assembly is properly mounted on the guide rail, all rollers are preloaded against the rail with loss of contact between the rail and any roller substantially eliminated at all times. The two preloaded face rollers insure that the side rollers stay aligned with the length dimension of the rail no matter how the conveying device moves and tilts. Also the preloaded side rollers in constant contact with the rail keep the face rollers aligned with the face of the guide rail. With the arrangement of four roller guide assemblies riding on two guide rails, as previously described any unbalance in or uneven movement of the conveying device and any misalignment or deflection of either guide rail is compensated for by various reactions in the roller guide assembly of the present invention. Warping of the guide rail towards or away from the face rollers 23, 24 is handled by the pivotal mounting of the outer cage member 29 in conjunction with the tensed spring 42. At the same time, any face unevenness in the rail at any one time between the two face rollers 23, 24 is compensated for by the pivotal mounting of the inner cage member 14 allowing tilting back and forth of the inner cage member. Warping of a guide rail laterally causing deflection of the rail away from the vertical is compensated for by the resilient bushings 32 which allow the pin 30 to twist out of perpendicular alignment with the sides of the outer cage member 29, thereby allowing the inner cage member 14 to twist in its mountings in the directions of arrows 47 (see FIG. 1). Advantageously, holes 48 are provided through the resilient bushings 32 to impart more resiliency to the bushings 32. Lateral deflection of the side running portions 11, 12 of the guide rail 10 so that they are not perpendicular to the side of the conveying device is also compensated for by the resilient bushings which allow the inner cage member 14 to twist in its mountings in the direction of arrows 49 (see FIG. 2). Unbalance and uneven movement of the conveying device causing movement or turning of the roller guide assembly in any direction is compensated for in the same ways as described in conjunction with the warping, misalignment or deflection of the guide rail.

The roller guide assembly of the present invention is seen to be of relatively simple and economical construction and yet so arranged and adapted as to allow preloading of all rollers against the guide rail to substantially eliminate loss of contact at all times between any roller and the rail and at the same time to insure that all side rollers and all face rollers maintain alignment with the guide rail on which they are running despite unevenness or warping in the guide rail and unbalance or uneven movement of the conveying device. Furthermore, the herein described novel roller guide assembly substantially eliminates any misalignment of side rollers due to deflection of face rollers and also any misalignment of face rollers due to deflection of side rollers. Also, elimination of direct metal contact between the mounting member for the rollers and the conveying device being guided is accomplished in a relatively simple manner by the provision of two elastomeric bushings on the roller mounting member.

What we claim as our invention is:

1. A roller guide assembly for a conveying device adapted to be guided by and ride on a guide rail having two opposing side roller running portions and a face roller running portion which comprises a substantially rigid roller mounting cage member having a face roller receiving portion and a side roller mounting portion, six rollers rotatably mounted on said cage member, each mounted in fixed position with respect to said cage member and with respect to each other, said six rollers being arranged in two spaced apart sets of three rollers, each set comprising two opposing side rollers rotatably mounted on the side roller mounting portion of the rigid cage member and adapted to run on the opposing side roller running portions of the guide rail and a face roller rotatably mounted in the face roller receiving portion of the rigid cage member in fixed relation with respect to said two opposing side rollers and adapted to run on the face roller running portion of the guide rail, mounting means for the cage member, said cage member being pivotally mounted on said mounting means and the pivotal mounting being located between the two sets of rollers, and flexible loading means for the cage member adapted to flexibly preload the face rollers against the face roller running portion of the guide rail.

2. A roller guide assembly as claimed in claim 1 wherein the cage member is pivotally mounted on a pin member attached to the mounting means and which includes elastomeric bushings interposed between said pin member and said cage member.

3. A roller guide assembly as claimed in claim 1 which includes a substantially rigid second cage member which is the mounting means for the roller mounting cage member, said second cage member being flexibly loaded to provide the flexible loading means for the roller mounting cage member.

4. A roller guide assembly as claimed in claim 3 which includes a mounting means for the second cage member on which said second cage member is pivotally mounted.

5. A roller guide assembly as claimed in claim 4 in which the flexible loading means is a spring arrangement preloading the second cage in the direction of the guide rail to thereby bring the face rollers into pressing engagement with the face roller running portion of the guide rail.

6. A roller guide assembly for a conveying device adapted to be guided by and ride on a guide rail having two opposing side roller running portions and a face roller running portion which comprises a substantially rigid first cage member having a face roller receiving portion and a side roller mounting portion, six rollers rotatably mounted on said first cage member, each mounted in fixed position with respect to said first cage member and with respect to each other, said six rollers being arranged in two spaced apart sets of three rollers, each set comprising two opposing side rollers rotatably mounted on the side roller mounting portion of the rigid first cage member and adapted to run on the opposing side roller running portions of the guide rail and a face roller rotatably mounted in the face roller receiving portion of the rigid first cage member in fixed relation with respect to said two opposing side rollers and adapted to run on the face roller running portion of the guide rail, mounting means for the first cage member comprising a substantially rigid second cage member and a pin attached thereto, said first cage member being pivotally mounted on the pin on the second cage member and the pivotal mounting being located between the two sets of rollers, elastomeric bushings interposed between the pin and the first cage member, a mounting means for the second cage member on which said second cage member is pivotally mounted and flexible loading means for the second cage member comprising a spring arrangement and adapted to preload the second cage in the direction of the guide rail to thereby bring the face rollers into pressing engagement with the face roller running portion of the guide rail.

7. A roller guide assembly as claimed in claim 6 wherein the first cage member is of U-shaped section in a plane perpendicular to the guide rail and said first cage member has bolts running therethrough adapted to draw the sides of the first cage member together to thereby draw the opposing side rollers together and load the side rollers against the side roller running portions of the guide rail.

8. A roller guide assembly as claimed in claim 7 wherein the first cage member has at least two of the bolts running therethrough and the face rollers are rotatably mounted on the said two bolts.

References Cited

UNITED STATES PATENTS 2,265,086  12/1941  Spiro _____ 187—95
3,087,583  4/1963   Bruns _____ 187—95

FOREIGN PATENTS 1,176,526  6/1957  France.
1,169,627  3/1964  Germany.

EVON C. BLUNK, *Primary Examiner.*

H. C. HORNSBY, *Assistant Examiner.*